United States Patent Office 3,321,420
Patented May 23, 1967

3,321,420
NITROCELLULOSE LACQUERS ADMIXED WITH COPOLYMERS OF ETHYLENE AND UNSATURATED ESTERS OF FATTY ACIDS
James G. Unger, Wilmington, Del., assignor to Hercules Incorporated, a corporation of Delaware
No Drawing. Filed Jan. 7, 1964, Ser. No. 336,123
4 Claims. (Cl. 260—17)

The present invention relates to novel nitrocellulose lacquers and, more particularly, to novel protective and decorative lacquers comprising nitrocellulose and a copolymer of ethylene and an ethylenically unsaturated ester of a saturated fatty acid.

Nitrocellulose has long been used as a principal film-forming ingredient of lacquers, and nitrocellulose-based lacquers have achieved a prominent position in the coating industry. Despite the general excellence of such lacquers, there has been a continued search for methods and materials capable of improving their performance characteristics.

In accordance with the present invention, it has been found that lacquers comprising organic solvent solutions of nitrocellulose and a particular type of copolymer of ethylene with an ethylenically unsaturated ester of a saturated fatty acid are characterized by a unique and unusual combination of desirable properties. More specifically, lacquers produced in accordance with this invention are characterized by unusually good flexibility, scuff resistance, freedom from blocking, tensile strength, resistance to migration of ink colors through protective overcoats, and good adhesion.

While the lacquers of the invention are useful in the printing and/or coating of a variety of substrates including paper, cellophane, paperboard, cloth, metal, leather, rubber, and wood, an outstanding example of their utility lies in the coating of untreated aluminum foil that retains traces of processing oils.

Heretofore it has been recognized that aluminum foil which retains traces of the processing oils employed in the manufacture thereof is an extremely difficult material on which to print and coat with decorative and protective coatings. Some success in providing inks and coatings for such foil has been achieved with vinyl chloride-vinyl acetate copolymer compositions. However, inks and coatings based on poly(vinyl chloride-acetate) compositions have been difficult to apply, are slow drying, and generally are less than satisfactory under conditions of use due to migration of ink colors through the protective overcoats, loss of adhesion, etc.

Although nitrocellulose compositions are noteworthy for their ease of application and quick drying characteristics, numerous and repeated efforts to adapt nitrocellulose compositions formulated with conventional resins and plasticizers to this use have been unsuccessful. Such compositions have been unable to provide the combination of properties necessary for successful application to untreated aluminum foil retaining traces of processing oils.

The lacquers of the invention exhibit not only excellent adhesion to such untreated aluminum foil, but also excellent tensile strength, flexibility, scuff resistance, and other desired properties, both initially and after exposure to environmental conditions.

In more detail, the lacquers of the invention comprise organic solvent solutions of nitrocellulose and a copolymer of ethylene and an ethylenically unsaturated ester of a saturated fatty acid that contains at least about 36% by weight of the latter monomer, i.e., the ethylenically unsaturated ester. Copolymers of the same ingredients which comprise less than about 36% by weight of the ester monomer exhibit almost total incompatibility with the nitrocellulose and are not useful in the invention. Desirably, the lacquers of the invention contain from about 20% to about 80%, and preferably from about 35% to about 65%, by weight of the aforesaid copolymer, based on the combined weight of nitrocellulose and copolymer.

The copolymers of ethylene and ethylenically unsaturated ester of saturated fatty acid which are suitable for the preparation of the novel compositions of this invention are essentially amorphous, high molecular weight solid resins having a weight ratio of units of ethylene to units of ethylenically unsaturated ester between about 64:36 and about 2:98, more preferably between about 64:36 and about 40:60. They can be made with a melt index, according to ASTM procedure D–1238–57T, of about 15 to about 150, more usually from about 26 to about 51.

The copolymers of this invention can be prepared by copolymerizing a mixture of ethylene and the ethylenically unsaturated ester of saturated fatty acid using catalysts and conditions known to the art. Suitable methods are disclosed in U.S. 2,200,429; U.S. 2,394,960; U.S. 2,395,381; and U.S. 2,703,794.

The ethylenically unsaturated esters of saturated fatty acids which are copolymerized with ethylene to produce the copolymers of this invention have the general formula RCOOR' in which R is selected from the group consisting of hydrogen and straight or branched chain alkyl radicals and R' is an alkenyl radical having a terminal $CH_2=C<$ group. Suitable alkyl radicals are those containing from 1 to about 18 carbon atoms, and preferably from 1 to about 6 carbon atoms, and include by way of example methyl, ethyl, propyl, isopropyl, butyl, isobutyl, secondary butyl, tertiary butyl, and straight and branched chain amyl, hexyl, heptyl, octyl, nonyl, decyl, undecyl, dodecyl, octadecyl, and the like radicals. Suitable alkenyl radicals are those having from 2 to about 12 carbon atoms, and preferably from 2 to about 6 carbon atoms, and include by way of example vinyl, allyl, isopropenyl, butenyl, pentenyl, hexenyl, heptenyl, octenyl, nonenyl, undecenyl, and dodecenyl radicals having a terminal $CH_2=C<$ group. Illustrative of typical ethylenically unsaturated esters of saturated fatty acids suitable for the purposes of this invention are vinyl formate, vinyl acetate, vinyl propionate, allyl acetate, allyl propionate, isopropenyl butyrate, hexenyl acetate, pentenyl hexanoate, allyl octanoate, nonenyl pentanoate, decenyl acetate, vinyl decanoate, propenyl undecanoate, vinyl dodecanoate, dodecenyl propionate, vinyl stearate, and the like. Copolymers of ethylene and vinyl acetate are presently preferred.

Substantially all commercial types and grades of nitrocellulose, irrespective of the method of manufacture, and having nitrogen contents from about 10.9% to about 13.5% nitrogen by weight, and of any viscosity characteristic from the very low viscosity 10 centipoise type to exceedingly high viscosity types as exemplified by dynamite grade nitrocellulose, are suitable for the purposes of this invention. For most coating applications, however, nitrocelluloses having nitrogen contents between about 10.9% and about 12.2% nitrogen by weight, and a viscosity characteristic below about 6 seconds by the standard ASTM 5/16 inch falling ball method, are preferred.

If and when desired, various conventional additives such as fillers, pigments, dyes, plasticizers, resins, waxes, and the like can be incorporated into the compositions of this invention in small amounts sufficient to effect special effects, such as coloring or moistureproofing, or heat sealing, or enhanced gloss, or the like. Generally, however, the total amount of such permissive conventional additives will not exceed about 50% by weight, and preferably will not exceed about 30% by weight, of the total nonvolatile components of the composition, the remainder being nitrocellulose and copolymer of ethylene and ethylenically unsaturated ester of saturated fatty acid. In no case, moreover, will such permissive additive be employed in an amount which can deleteriously affect to any substantial degree the desirable characteristics of the binary composition of nitrocellulose and copolymer of ethylene and ethylenically unsaturated ester of saturated fatty acids, as set forth hereinabove.

The compositions of this invention can be readily prepared and applied by any of the well-known and conventional methods for preparing and applying conventional nitrocellulose lacquer compositions. For example, it is merely necessary to dissolve and homogeneously blend together the nitrocellulose and copolymer of ethylene and ethylenically unsaturated ester of saturated fatty acid, together with any desired permissive additive, in a typical and conventional volatile nitrocellulose lacquer solvent or solvent mixture, apply the resulting lacquer solution to the surface to be coated by spraying, dipping, roller coating, spreading with a doctor blade or rod, printing, and the like, and then air dry at ambient and/or elevated temperature to evaporate the volatile solvent and deposit the nonvolatile components of the composition as a homogeneous, adherent coating on the surface of the substrate.

The general nature of the invention has been set forth, and the following examples are presented as some specific illustrations thereof:

*Example 1*

The following nitrocellulose lacquer was prepared:

Ingredients:                                         Parts by weight
  Nitrocellulose [1] _____ 10
  Copolymer of ethylene and vinyl acetate [2] ____ 10
  Toluene _____ 32
  Butyl acetate _____ 32
  Butanol _____ 16

[1] Nitrocellulose having 11.9 to 12.2% nitrogen by weight, and an ASTM 5/16 inch falling ball viscosity characteristic of ½ second measured on a 12.2% by weight solution of the nitrocellulose in a solvent composed of 55% toluene, 25% denatured ethyl alcohol, and 20% ethyl acetate by weight at 25° C., noting the time in seconds for a 5/16 inch steel ball to fall freely ten inches through the solution.
[2] Copolymers of ethylene and vinyl acetate having a weight ratio of ethylene to vinyl acetate of 60:40, a melt index, according to ASTM procedure D-1238–57T, of about 30; and a reduced specific viscosity as determined on a 0.1% solution of the copolymer in toluene of about 0.081 at 25° C.

Free films approximately 3 mils thick were prepared from the above lacquer composition by casting wet films thereof, calculated to dry to 3 mils in thickness, on level glass plates with a film casting knife, and drying overnight at room temperature. The films were then stripped from the glass plates and force-dried at 70° C. in a circulating air oven for 24 hours, and then conditioned for 48 hours at 77° F. and 50% relative humidity. Tensile strength, percent elongation, Young's modulus, and flexibility by the Massachusetts Institute of Technology double fold test (MIT double folds) were determined on standard test specimens prepared from the conditioned films as follows:

Tensile strength, p.s.i. ASTM–088261T ____ 5,500±300
Percent elongation _____ 41±4
Young's Modulus, p.s.i. _____ 150,000±20,000
MIT double folds 200 gram load—ASTM643–43 _ 12,760

The above lacquer composition was applied to the clay-coated side of white lithographic paper stock having a basis weight of 53 pounds per ream, including 12 pounds per ream of clay coating, with a No. 5 Mayer rod. The coated paper was air dried at room temperature to the tack-free stage whereupon it was force dried for 2 minutes at 180° F. Dried coating weight was approximately 4 pounds per ream (3,000 sq. ft.) as determined on a Schopper basis weight scale (a standard instrument universally used in the paper manufacturing industry).

The coated paper was then conditioned for 48 hours in a constant temperature and constant humidity room at 77° F. and 50% relative humidity, and was tested for flexibility and scuff resistance at this temperature and relative humidity.

Flexibility of the coated paper was measured using a series of five cylindrical metal mandrels having diameters of 1/32, 1/16, 1/8, 1/4 and 1/2 inch. The test was made by gently but firmly pressing the coated paper, the uncoated side against the mandrel, around the circumference of the mandrel, and brushing the stressed area of the coating over the mandrel with turpentine tinted with soluble red dye. Any rupture of the coating due to lack of flexibility was revealed by penetration of the dyed turpentine into the paper beneath the coating. The procedure was to start with the largest diameter mandrel and progressively test over each succeeding smaller diameter mandrel until a mandrel was formed over which the coated paper could not be pressed without rupture, as noted by the dyed turpentine test. Coatings which are still perfectly flexible over the 1/32 inch mandrel were then subjected to a crease test by folding the coated paper double with the coated side out and creasing between the forefinger and thumb, and testing for rupture of the coating with dyed turpentine, as noted above.

Scuff resistance was measured with a Sutherland Ink Rub Tester (Sutherland Paper Company, Kalamazoo, Michigan). This instrument is described and claimed in U.S. Patent 2,734,375. In this test No. ½ emery polishing paper was used as the abrading medium on the scuffing foot at a pressure of 0.5 pound per square inch, and at the rate of 45 reciprocating scuffing cycles per minute. The coating was scuffed for a predetermined number of reciprocating cycles, for example, 50 cycles, and then tested in the scuffed area with dyed turpentine for evidence of coating rupture in the same manner noted above for flexibility failure. Coatings which resisted scuffing failure in the above initial testing were then tested further, employing a fresh specimen of coated paper for each such further test, and doubling the number of scuffing cycles for each successive test until coating rupture was noted by the dyed turpentine test. A scuffing resistance of 200 cycles without failure of the coating is considered excellent.

The coated paper was also tested for blocking resistance by placing specimens of the coated paper, coated face to coated face (face to face), and other specimens of the coated paper, coated face to uncoated face (face to back), in an air oven at 140° F., each under a pressure of 2 pounds per square inch for 40 hours. Sheets which fell apart without clinging to each other after this exposure were rated as having satisfactory blocking resistance, recorded as "No Blocking."

The following table sets forth the results of the flexibility, scuff resistance, and blocking resistance of the above coated paper:

| Test: | Result |
|---|---|
| Flexibility (mandrel test) | No failure when creased. |
| Scuff resistance (Sutherland Ink Rub Tester) | No failure after 800 cycles—not tested further. |
| Blocking resistance, 40 hrs. at 140° F. under a pressure of 2 p.s.i. | |
| Face to face | No blocking. |
| Face to back | No blocking. |

The above lacquer composition was also applied to unprimed and untreated aluminum foil retaining traces of processing oils, to shellac primed aluminum foil, and to aluminum foil primed with a poly(vinyl chloride-acetate) resin with a No. 3 Mayer rod. The thus coated aluminum foils were air dried at room temperature to the tack-free stage, force dried for 2 minutes in a circulating air oven at 180° F., and then conditioned for approximately 16 hours in a constant temperature and constant humidity room at 77° F. and 50% relative humidity. Dried coating weights were approximately 1.9 pounds per ream (3000 sq. ft.).

Adhesion of the applied coatings on the aluminum foils was determined by means of the Scotch tape test. In this test Scotch Brand Acetate Film Tape No. 800 (3M) (Minnesota Mining and Manufacturing Co., St. Paul, Minneapolis) was employed. A short strip of the adhesive tape was pressed firmly on the coated foil, and was then removed abruptly by a quick pull. Adhesion was rated as excellent when the adhesive tape came away cleanly without any of the coating adhering to it; as fair when only an occasional fragment of coating adhered to the removed adhesive tape; and poor when substantial areas of the coating adhered to the removed adhesive tape.

Results of the Scotch tape adhesion test for the three coated aluminum foils follow:

| Identity of coated foil: | Adhesion of coating to foil (Scotch tape test) |
|---|---|
| Unprimed and untreated aluminum foil retaining traces of processing oils | Excellent. |
| Shellac primed aluminum foil | Excellent. |
| Aluminum foil primed with a poly(vinyl chloride-acetate) resin | Excellent. |

Example 2

A blue nitrocellulose ink composition and a clear nitrocellulose coating composition were prepared, employing the same nitrocellulose and the same copolymer of ethylene and vinyl acetate used in Example 1. The composition of the ink and of the clear lacquer follow:

| Ingredients | Blue Ink Composition, Parts by Weight | Clear Coating Composition, Parts by Weight |
|---|---|---|
| Nitrocellulose | 13.39 | 12.5 |
| Copolymer of Ethylene and Vinyl Acetate | 12.50 | 12.5 |
| Ethyl Acetate | 2.16 | |
| Butyl Acetate | 30.00 | 30.0 |
| Toluene | 30.00 | 30.0 |
| Ethyl Alcohol | 2.16 | |
| Butyl Alcohol | 15.00 | 15.0 |
| Dioctylphthalate | 0.29 | |
| Phthalocyanine Blue | 1.31 | |
| Solids as Applied | *29.8 | *30 |

*Percent.

Substantially the same procedure described in Example 1 for coating aluminum foil was employed in this example to prepare conditioned coatings on unprimed and untreated aluminum foil retaining traces of processing oils, shellac primed aluminum foil, and aluminum foil primed with a poly(vinyl chloride-acetate) resin. In one series of coatings a 1.9 pound per ream (3000 sq. ft.) dry weight of the above blue ink was first applied to each of the foils, and the ink coatings were dried 10 minutes at room temperature. Then a 1.9 pound per ream coating, dry weight, of the clear composition was applied over each of the ink-coated foils, dried to the tack-free state at room temperature, and then force dried for 2 minutes in a circulated air oven at 180° F. These inked and overcoated foils were then conditioned overnight in a constant temperature and constant humidity room at 77° F. and 50% relative humidity. In another series of coatings the clear coating composition was applied directly to the three aluminum foils without an ink coating, and the coatings were air dried, force dried, and conditioned as set forth above.

Adhesion of the conditioned coatings on each of the foils was then determined initially by means of the Scotch tape test described in Example 1. Adhesion by the Scotch tape adhesion test was also determined on each of the coated foils after soaking specimens of each coated foil in high test gasoline for 30 minutes, wiping dry, and testing, after soaking specimens of each coated foil in high detergency mineral oil for one week, wiping off adhering oil, and testing, and after soaking specimens of each coated foil in a methanol-Dry Ice bath for one hour, wiping dry, and immediately testing while still cold. Resistance to migration of ink color through the protective clear overcoat after the gasoline soak and after the oil soak was determined by wiping the specimens immediately after removal from the soaking baths with a clean white cloth, and observing the wiping cloth for blue stain.

The following table shows adhesion and resistance to migration of ink color obtained on the several coated aluminum foils.

| Identity of Coated Foil | Scotch Tape Adhesive | | | | After 1 Hr. Methanol-Dry Gel Soak | Resistance to Migration of Ink Color |
|---|---|---|---|---|---|---|
| | Initial | After 30 Minute Gasoline Soak | After 1 Week Oil Soak | | | |
| A. Clear Coating Only: | | | | | | |
| Unprimed and untreated aluminum foil retaining traces of processing oil. | Excellent | Excellent | Excellent | | Excellent | |
| Shellac primed aluminum foil | do | do | do | | do | |
| Aluminum foil primed with a poly (vinyl chloride-acetate) resin. | do | do | do | | do | |
| B. Initial Ink Coating Overcoated with Clear Coating: | | | | | | |
| Unprimed and untreated aluminum foil retaining traces of processing oil. | do | do | do | | do | No migration. |
| Shellac primed aluminum foil | do | do | do | | do | Do. |
| Aluminum foil primed with a poly (vinyl chloride-acetate) resin. | do | do | do | | do | Do. |

Example 3

In this example a lacquer was formulated as in Example 1 but using 16 parts by weight of nitrocellulose and 4 parts of ethylene-vinyl acetate copolymer instead of 10 parts of each. This lacquer was used to coat white lithographic paper stock as described in Example 1 and subjected to the flexibility, scuff resistance, and blocking resistance tests described in that example. In the flexibility test, the lacquer passed the ¼" mandrel, showed a scuff resistance of 150–200 cycles, and was nonblocking.

Example 4

A lacquer was prepared as in Example 1 except that 4 parts of nitrocellulose and 16 parts of ethylene-vinyl acetate copolymer was used instead of 10 parts of each. This lacquer was coated on white lithographic paper stock and evaluated as before. It passed the flexibility test, had a scuff resistance of 150–200 cycles, and failed the blocking test after 16 hours.

Example 5

A lacquer was formulated as in Example 1 except that the amount of nitrocellulose used was 11.1 parts by weight, and the amount of ethylene-vinyl acetate copolymer used was 8.9 parts by weight. The lacquer was coated on white lithographic paper stock as before. In the flexibility test the lacquer passed the 1/16" mandrel, had a scuff resistance of 300+ cycles, and was nonblocking.

The lacquer was also used to coat untreated aluminum foil as in Example 1, and the adhesion of the coating was excellent.

*Example 6*

A lacquer was formulated as in Example 1 except that the amount of nitrocellulose used was 8.9 parts by weight and the amount of ethylene-vinyl acetate copolymer used was 11.1 parts by weight. The lacquer passed the flexibility test, had a scuff resistance of 300+ cycles, and was nonblocking.

The lacquer was also used to coat untreated aluminum foil as in Example 1, and the adhesion was excellent.

*Example 7*

This example demonstrates the formulation of a heat-sealable lacquer using nitrocellulose having a nitrogen content of 10.9–11.2% and a falling ball viscosity of 1/2 second. The formulation was as follows:

| Ingredients: | Parts by weight |
|---|---|
| Nitrocellulose | 12.5 |
| Ethylene-vinyl acetate copolymer (as defined in Example 1) | 12.5 |
| Toluene | 30.0 |
| Butyl acetate | 30.0 |
| Butanol | 15.0 |

The lacquer was used to coat paper. The paper was heat-sealed at 375° F. for 1/2 second dwell time and 20 p.s.i. bar pressure in a Sentinel heat sealer; a paper-tearing heat seal was produced.

*Example 8*

This example demonstrates the formulation of a pigmented lacquer. The formulation of the lacquer was as follows:

| Ingredients: | Parts by weight |
|---|---|
| Nitrocellulose (11.9–12.2% $N_2$, 18–25 cps. viscosity) | 10.9 |
| Ethylene-vinyl acetate copolymer (as defined in Example 1) | 10.9 |
| Titanium dioxide | 12.7 |
| Butyl acetate | 26.2 |
| Toluene | 26.2 |
| Butanol | 13.2 |

*Example 9*

This example describes a lacquer capable of producing a scuff-resistant coating that adheres well to a wood substrate. The formulation of the lacquer was as follows:

| Ingredients: | Parts by weight |
|---|---|
| Nitrocellulose (11.9–12.2% nitrogen, 15–20 sec. viscosity) | 6.25 |
| Ethylene-vinyl actate copolymer (as defined in Example 1) | 6.25 |
| Toluene | 31.0 |
| Butyl acetate | 31.0 |
| Butanol | 15.5 |
| Cellosolve acetate | 10.0 |

Three coats of this lacquer were spray-applied on a maple panel. The first and second coats were sanded, and the final coat was allowed to air-dry undisturbed. The adhesion and scuff resistance were excellent.

From the foregoing description it will be apparent that this invention accomplishes the objectives sought and provides novel nitrocellulose protective and decorative coatings having a unique and unusual combination of desirable properties for coating a wide variety of substrates.

What I claim and desire to protect by Letters Patent is:

1. A lacquer comprising an organic solvent solution of nitrocellulose and a copolymer of ethylene and an ethylenically unsaturated ester of a fatty acid, said copolymer comprising at least about 36% by weight of said ester and being present in the amount of about 20% to 80% by weight, based on the combined weight of said nitrocellulose and said copolymer.

2. A lacquer according to claim 1 in which said copolymer is a copolymer of ethylene and vinyl acetate.

3. A lacquer according to claim 2 in which the copolymer of ethylene and vinyl acetate is present in an amount of from about 35% to 65% by weight, based on the combined weight of nitrocellulose and said copolymer.

4. Aluminum foil having an adherent coating thereon, said coating consisting essentially of nitrocellulose and a copolymer of ethylene and an ethylenically unsaturated ester of saturated fatty acid, said copolymer comprising from about 20 to 80% by weight of said coating, and said copolymer comprising at least about 36% by weight of said ester.

No references cited.

WILLIAM H. SHORT, *Primary Examiner.*

J. NORRIS, *Assistant Examiners.*